UNITED STATES PATENT OFFICE.

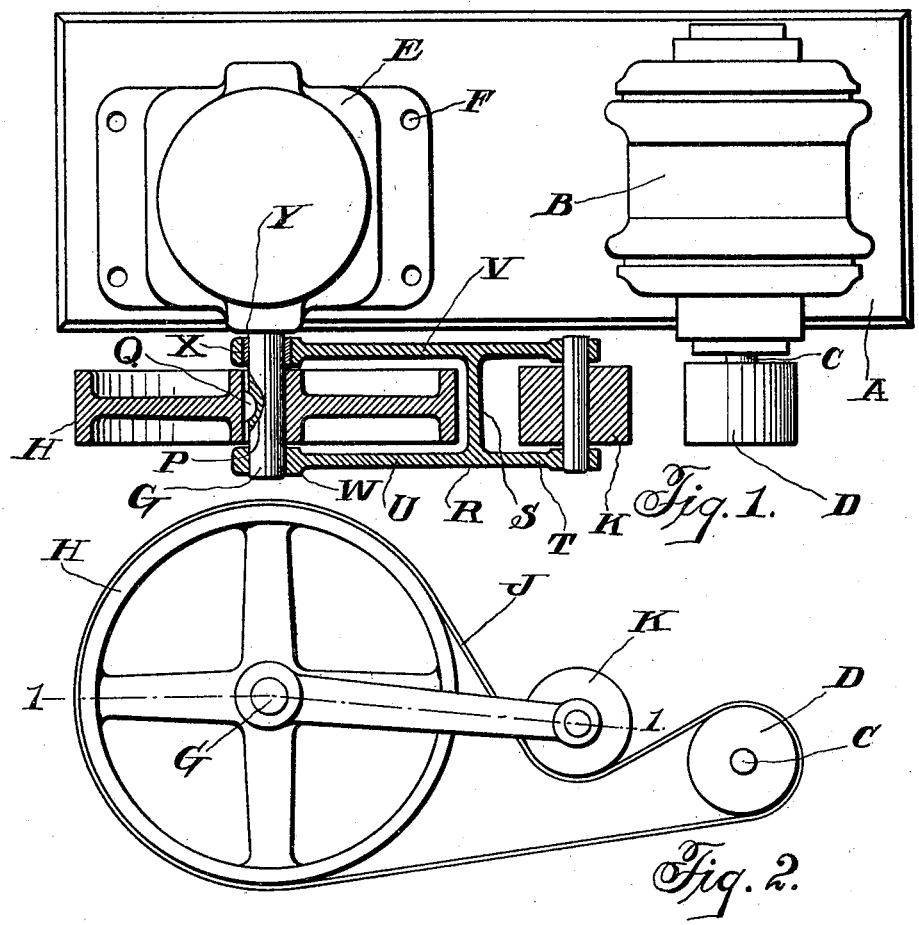

CLAUDE PITTS, OF PAINTED POST, NEW YORK, ASSIGNOR TO INGERSOLL-RAND COMPANY, OF JERSEY CITY, NEW JERSEY, A CORPORATION OF NEW JERSEY.

BELT-DRIVE.

1,383,850.      Specification of Letters Patent.      Patented July 5, 1921.

Application filed August 30, 1920. Serial No. 406,926.

*To all whom it may concern:*

Be it known that I, CLAUDE PITTS, a citizen of the United States, and resident of Painted Post, county of Steuben, and State of New York, have invented a certain new and useful Improvement in Belt-Drives, of which the following is a specification accompanied by drawings.

This invention relates to a belt drive for power driven apparatus, but more particularly to a short belt drive, when it is desired to locate the driving and driven elements near together.

It is often desirable to be able to use either a long drive or a short drive according to the conditions of operation, and one of the principal objects of the present invention is to make such a change from one drive to the other conveniently and quickly possible with the same apparatus, and by simple changes in connection with the driven element.

Another object of the invention is to enable an idler pulley frame for a short belt drive to be pivotally mounted upon the driven shaft carrying the driven pulley so that the idler pully acting as a belt tightener, swings about the axis of rotation of the driven pulley.

A further object of the invention is to secure simple and readily adjustable means for assembling the idler pulley frame and driven pulley on the shaft with the driven pulley arranged between the arms of the frame so that the frame is pivoted on the driven shaft at each side of the said pulley.

To all of these ends the invention is shown in one of its preferred forms in the accompanying drawings in which Figure 1 is a diagrammatic top plan view partly in horizontal section on the line 1—1 of Fig. 2, of an assembly of driving and driven elements and a short belt drive in accordance with my invention, and Fig. 2 is a detail side elevation of the drive showing a belt on the pulleys.

Referring to the drawings, A represents a base or bed plate having a driving element shown as a motor B mounted thereon provided with the driving shaft C and the belt pulley D. A driven element shown in this instance as an air compressor E is also adapted to be mounted on the base A in the usual manner as by means of the bolt holes F and suitable base bolts (not shown) and the compressor is provided with the driven shaft G on which the driven pulley H is adapted to be mounted. In Fig. 1 the driving and driven elements are shown in such relation, that a short belt drive is provided between the driving and driven pulleys as indicated in Fig. 2 in which the belt J is shown passing over the pulleys and under the idler pulley K which acts as a belt tightener to take up slack in the belt.

In case it should be found desirable to separate the driving and driven elements to a sufficient distance to require a long belt drive, the idler pulley K and its mounting may ordinarily be omitted and a loose pulley may be mounted on the driven shaft beside the driven pulley H, so that the belt may be shifted in the usual manner from one pulley to the other as desired for driving the compressor or for permitting the driving element to rotate without driving the compressor. In such case the same driven shaft G may be used if of sufficient length to receive the loose pulley and in accordance with my construction, either the long drive or the short drive may be used with the same driving and driven elements depending upon their distance apart, and I have shown the shaft G provided with a slot or key-way P adapted to receive a key Q in this instance shown as a Woodruff key although any other accepted device may be provided for making the driven pulley H fast to the driven shaft.

In order to change from the long drive to the short drive I provide an idler pulley frame R preferably of forked construction having the crosspiece or bar S, the shorter arms T carrying the idler pulley K, and the longer arms U and V provided with bearing portions W and X preferably in the form of eyes or rings adapted to pass over the driven shaft G. The bore of the bearing portion X as shown is sufficiently larger in diameter than the bore of the bearing portion W, to pass over the driven shaft G and the key Q after the key is placed in the shaft. This construction is provided in order that the idler pulley frame R with the driven pulley H arranged between the arms U and V may be assembled on the driven shaft G after the said key Q has been inserted in the keyway P. In assembling the short belt drive, the pulley H is placed between the arms U and V and these members are passed over the shaft G into the position indicated in Fig. 1. A liner preferably in the form of a bearing sleeve Y of any suitable material such as metal is adapted to be inserted within the bearing portion X of the larger bore after the parts have been assembled in order to aline the frame R on the driven shaft G.

The short belt drive construction shown and described is simple, efficient, easily assembled and disassembled and an additional advantage resides in the fact that the frame R for the outer pulley K is pivoted about the same axis as that of the driven pulley which reduces the strain on the parts.

I claim:

1. A short belt drive, comprising a driven shaft, a pulley adapted to be keyed to said shaft, and an idler pulley frame having arms provided with bearing portions, the bore of one bearing portion being sufficiently larger than the other to pass over a key in the driven shaft, whereby the idler pulley frame with the pulley arranged between the arms thereof, may be assembled on the driven shaft after the said key has been inserted in the shaft.

2. A short belt drive, comprising a driven shaft, a driven pulley adapted to be secured to rotate with said shaft, and an idler pulley frame having arms provided with bearing portions in the form of eyes, the said idler pulley frame and driven pulley being adapted to be assembled on the shaft with the driven pulley arranged between the arms of the frame, whereby the said frame is pivoted about the same axis as that of the driven pulley.

3. In a short belt drive, the combination of a driving element having a driving shaft and a belt pulley, a driven element having a driven shaft provided with a key-way and key, a pulley adapted to be keyed to said driven shaft, a forked frame carrying an idler pulley at one end and having arms provided with bearing portions in the form of eyes at the other end, one eye being of sufficiently larger bore than the other to pass over the key in the driven shaft, whereby the idler pulley frame with the driven pulley arranged between the arms thereof may be assembled on the driven shaft after the said key has been inserted in the key-way.

4. In a short belt drive, the combination of a driving element having a driving shaft and a belt pulley, a driven element having a driven shaft provided with a key-way and key, a pulley adapted to be keyed to said driven shaft, a forked frame carrying an idler pulley at one end and having arms provided with bearing portions in the form of eyes at the other end, one eye being of sufficiently larger bore than the other to pass over the key in the driven shaft, whereby the idler pulley frame with the driven pulley arranged between the arms thereof may be assembled on the driven shaft after the said key has been inserted in the key-way, and a liner in the form of a bearing sleeve adapted to be inserted within the said bearing portion or eye of larger bore after the parts have been assembled.

In testimony whereof I have signed this specification.

CLAUDE PITTS.